Aug. 8, 1967  J. H. STEWARD  3,334,724
VARIABLE STRENGTH MAGNETIC NUT FEEDER
Filed March 16, 1966  3 Sheets-Sheet 1
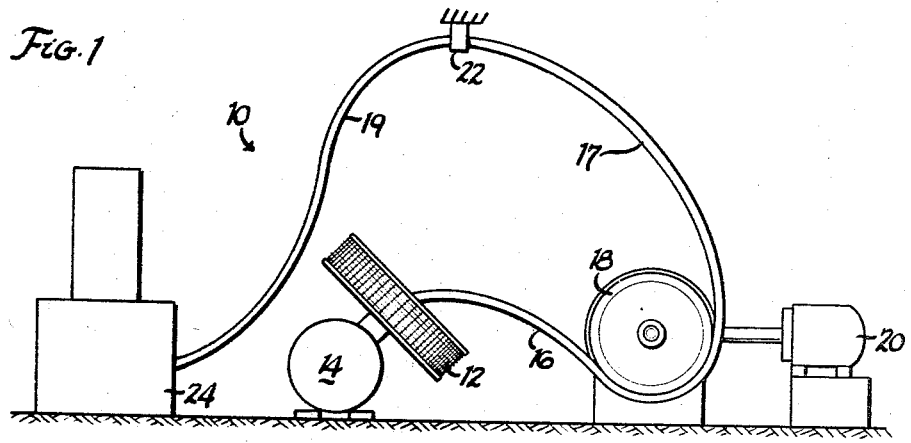
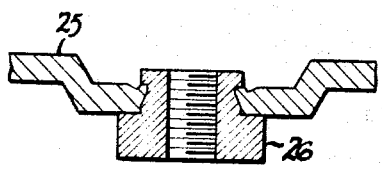
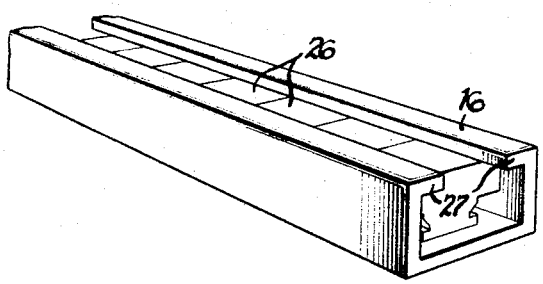
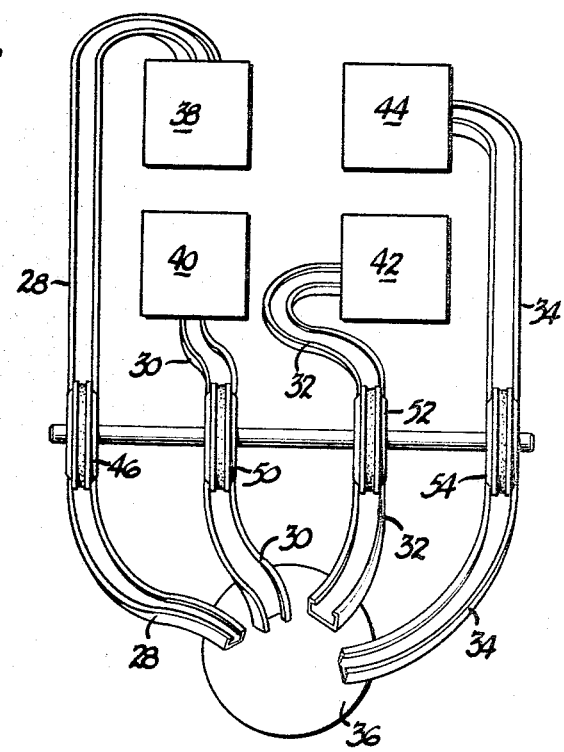
Inventor.
JERRY H. STEWARD
By
Wilson, Settle, Batchelder,
ATT'YS. & Craig Aug. 8, 1967
J. H. STEWARD
3,334,724
VARIABLE STRENGTH MAGNETIC NUT FEEDER
Filed March 16, 1966
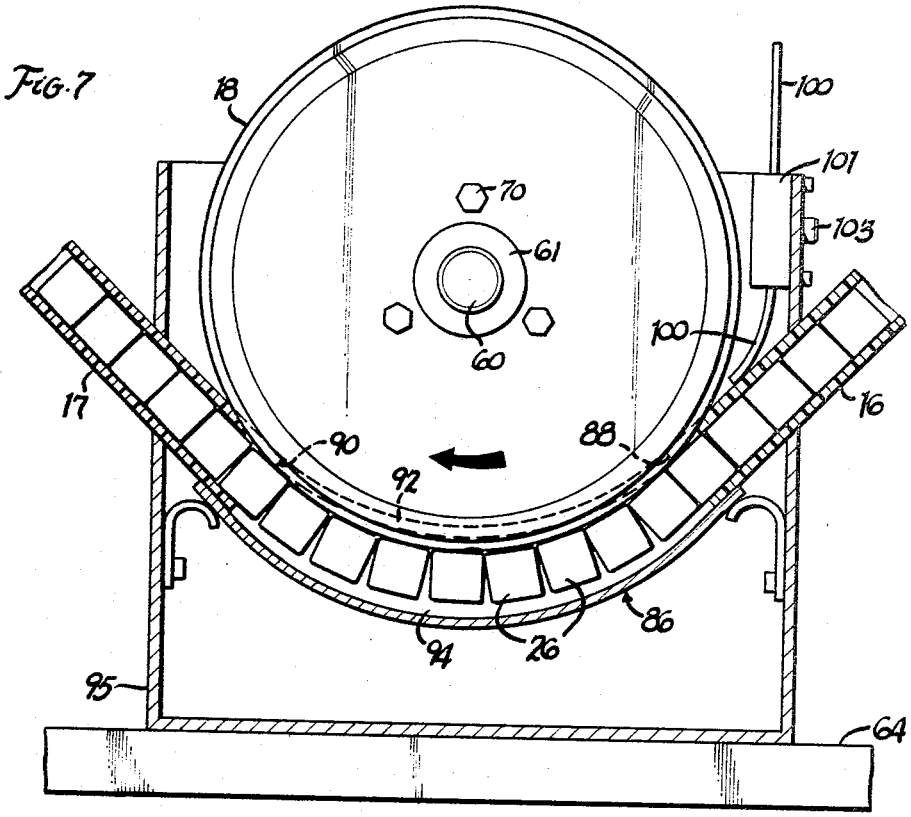
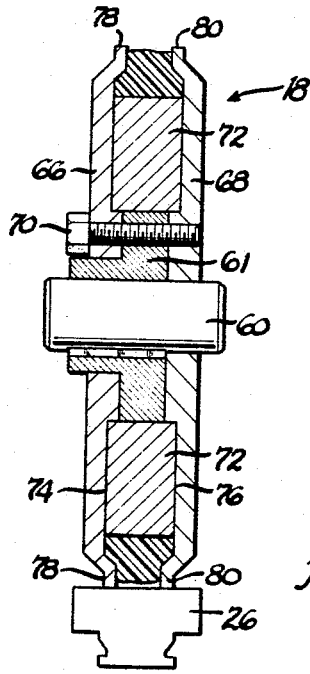
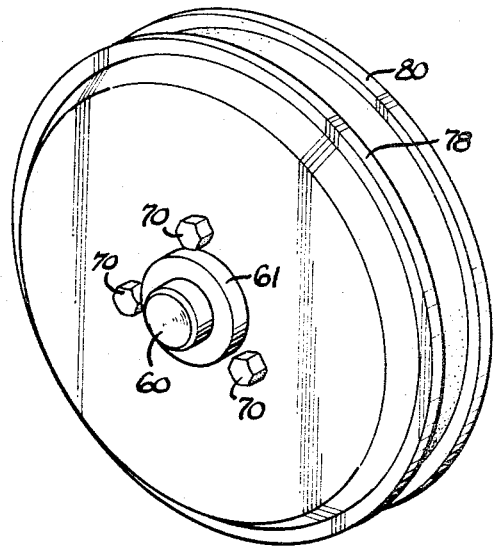
Inventor.
JERRY H. STEWARD
By
Wilson, Settle, Batchelder
ATT'YS. & Craig Aug. 8, 1967   J. H. STEWARD   3,334,724
VARIABLE STRENGTH MAGNETIC NUT FEEDER
Filed March 16, 1966   3 Sheets-Sheet 3

Inventor.
JERRY H. STEWARD
By
Wilson, Settle, Batchelder
Attys. & Craig

United States Patent Office 3,334,724
Patented Aug. 8, 1967

3,334,724
VARIABLE STRENGTH MAGNETIC NUT FEEDER
Jerry H. Steward, Bloomfield Hills, Mich., assignor to
Multifastener Corporation, Detroit, Mich.,
Filed Mar. 16, 1966, Ser. No. 534,904
16 Claims. (Cl. 198—41)

ABSTRACT OF THE DISCLOSURE

Nuts or other objects of magnetic material are fed through a chute from a source via a magnetic wheel to a work area. The magnetic wheel has opposite magnetic poles around the rim thereof; that is, one pole extends all the way around the rim on one side thereof and the other pole extends all the way around the rim on the other side thereof. The wheel rim projects into the chute and contacts nuts therein to retain those nuts temporarily on the wheel rim by magnetic attraction. The wheel is rotated to push nuts downstream from the wheel with the nuts retained on the wheel, and the arcuate length of the wheel rim which is in contact with nuts in the chute determines the force available to do this pushing. This arcuate length is the effective length of the wheel rim, and the effective length may be adjusted by a device which is adjustable to hold nuts away from the wheel rim. In one embodiment a spacer member is inserted between the wheel rim and the nuts to separate a selected number of nuts from the wheel. In other embodiments the wheel rim and a portion of the chute are mounted for relative movement and are set in positions where only a selected number of nuts come in contact with the wheel rim.

---

This invention relates generally to the feeding of nuts, bushings or other objects to an installation area of a machine, and more particularly to such a feeding apparatus and method wherein nuts or the like are driven through a chute leading to an installation area by a magnetic wheel.

It is common practice to feed pierce nuts to an installation machine such as a punch press through a chute which may be made of plastic or metal. The nuts should slide freely through the chute to a stop in the machine from which they are indexed to the punch press which installs them on a panel. Since the feed rate is ordinarily greater than the installation rate, nuts stack up back toward the feeder, and when the chute is full back to the feeder, the feeder must stop feeding temporarily until the chute can accept another nut. If the feeding force is too great, the nut stop in the press may be damaged. Occasionally, a nut may get stuck in the chute due to misalignment or perhaps a burr on a nut getting caught on an edge in the chute. Again, the feeder should idle until the stoppage is removed, and if the feeding force is too great, the jammed nut may dig into the chute, thus leaving an edge which may cause further stoppage. It is evident that some way of adjusting the feeding force has been needed.

It has been found according to the invention that the feeder may advantageously be a magnetic wheel which has opposite poles at and extending around its rim. The rim of the wheel extends into the chute to contact a predetermined number of nuts and retain those nuts temporarily on the rim by magnetic attraction. If the resistance to flow of nuts should exceed the maximum available impelling force, for example due to jamming, the wheel simply slips on the nuts retained on the wheel until the malfunction is corrected.

The nuts on the wheel impel nuts ahead of them through the chute, and the effective impelling force can be varied by either (1) varying the magnetic force of the wheel or (2) varying the number of nuts subjected to the magnetic force of the wheel. The present invention now proposes that the impelling force of the wheel be varied by varying the number of nuts which are retained on the wheel. Several specific ways of accomplishing this variation are described herein.

It is, therefore, an object of the invention to provide a feeding apparatus for nuts or other objects with a magnetic drive that is not harmed by jamming or stoppage of nuts or the like in a supply chute.

Another object of the invention is to provide a magnetic wheel type of driver in a nut feeding system with an adjustment for varying the force available for impelling nuts from the wheel through a chute.

A further object of the invention is to vary the impelling force of a magnetic wheel type of driver by varying the number of nuts retained on the wheel, thereby varying the driving force exerted on other nuts downstream of the wheel.

Other objects of this invention will appear in the following description and appended claims, reference being had to the accompanying drawings forming a part of this specification wherein like reference characters designate corresponding parts in the several views.

On the drawings:

FIGURE 1 is a schematic view of nut feeding apparatus in accordance with one embodiment of the invention;

FIGURE 2 is a schematic view of a nut feeding system in which nuts are fed from a single hopper to four different nut installation stations;

FIGURE 3 is a perspective view of a length of chuting through which nuts travel to an installation area;

FIGURE 4 is a sectional view of a nut and panel assembly after the nut has been secured to the panel;

FIGURE 5 is a perspective view of a magnetic wheel included in the apparatus of FIGURE 1;

FIGURE 6 is a vertical sectional view of the wheel of FIGURE 6;

FIGURE 7 is an elevational view, partly in section, of a wheel and channel assembly with one specific means for varying the effective driving force of the wheel, i.e., means variably interposed between the wheel and the channel;

Figure 9:
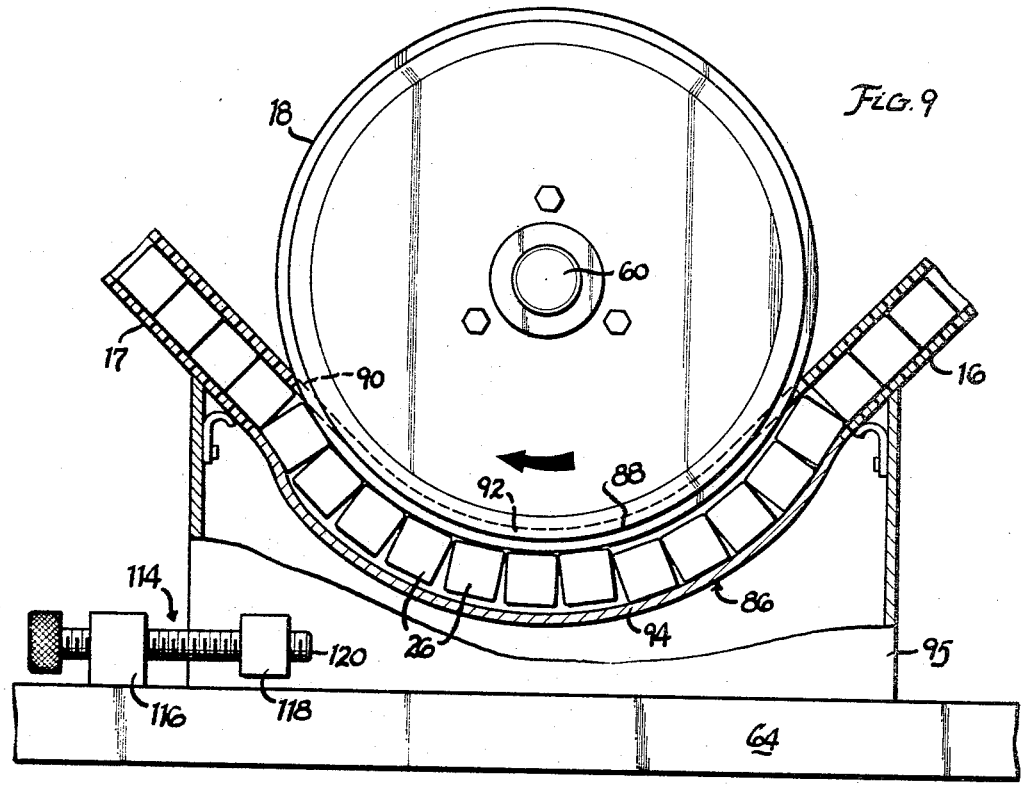
Figure 8:
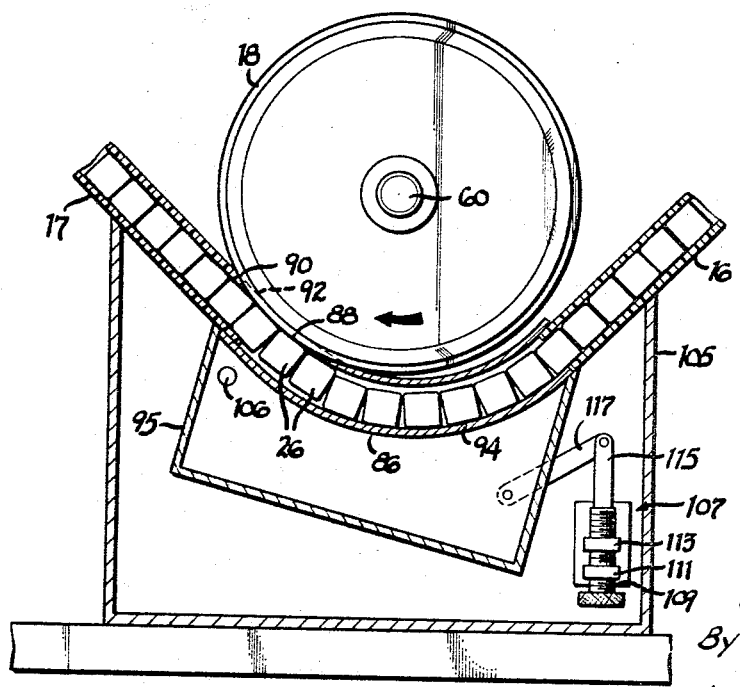

FIGURE 8 is a view similar to FIGURE 7, but showing a different specific force-varying means, i.e., a pivoted channel providing an adjustment for varying the number of nuts retained on the magnetic wheel; and FIGURE 9 is another view similar to FIGURE 7, but showing a different embodiment of the invention; i.e., a channel which is slidably adjustable relative to the wheel, thereby controlling the number of nuts retained on the wheel.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In the nut feeding apparatus 10 of FIGURE 1, nuts are stored in a rotary hopper drum 12 which is rotated by a motor 14. As the nuts in the hopper drum 12 tumble over and over, nuts are automatically selected and fed serially into a chute 16. These nuts travel first to a magnetic wheel driver 18 which is rotated by a motor 20. The magnetic wheel 18 pushes nuts upward through a portion 17 of the chute to an overhead support 22 from which the nuts slide down a gravity feed portion 19 of the chute to a punching machine 24 where they are installed one at a time in a panel. Thus, the nuts feed by gravity through portions 16 and 19 of the chute, and they are driven upward through portion 17 of the chute by the magnetic wheel 18.

FIGURE 3 shows a short length of the chute 16 and a number of nuts in the chute in a side-by-side relationship such that each nut pushes the nut ahead of itself. The chute 16 is a channel shaped member which may be made of plastic or metal, the plastic material being preferred because the plastic chute may have some flexibility, thereby allowing the chute to follow a curved path as in FIGURE 1. FIGURE 4 shows one of the nuts 26 after it has been installed in a panel 25 and secured thereto by a swaging operation so that the nut is held firmly in place. The nut illustrated here is a pierce nut of the type described and claimed in United States Patent No. 3,187,796 issued to P. E. Double and assigned to the present assignee.

FIGURE 2 is a schematic view of a system wherein four chutes 28, 30, 32 and 34 lead from a single hopper 36 to four different installation stations 38, 40, 42 and 44. The chutes may lead directly to the stations, or one or more of the chutes may be of the gravity feed type illustrated in FIGURE 1. A punch press is provided at each of these stations, and there are four wheels 46, 50, 52 and 54, one for each chute, to drive nuts through the respective chutes to the installation stations. In a system of this type, the nuts are fed through chutes of different lengths, and thus encounter different resistances to flow in the individual chutes. It is desirable to be able to adjust the force which impels the nuts through the chutes from the driving wheels to the installation stations. Such an adjustment of driving force is desirable for other applications as well.

For instance, one wheel may be used to drive fairly large nuts, and another wheel may be used to drive very small nuts weighing much less than the larger size. The wheel driving the smaller nuts does not have to provide as much driving force as the wheel driving the larger nuts, and it is desirable to use less force for the small nuts to minimize the risk of damage due to jamming of nuts in the chute.

One of the advantages of using a magnetic wheel driver is that if the resistance encountered by the nuts is greater than the force available to drive them, the magnetic wheel simply slips on the nuts until the stoppage is corrected. If there is too much driving force, however, the excess force might worsen the jamming conditions, so it is desirable to use only as much driving force as is needed for the size of the nuts being driven.

FIGURE 7 considered with FIGURES 5 and 6 illustrate one embodiment of the magnetic driving wheel of the invention which has an adjustable finger attachment 100 for adjusting the number of nuts retained on the driving wheel 18 and thereby varying the force available to push nuts through the chute section 17. The wheel 18 is affixed to a shaft 60. As shown in FIGURE 6, the wheel includes two sections 66 and 68 which are secured together by cap screws 70. An annular magnet 72 is clamped between the two wheel sections 66 and 68. Sleeves 61 of non-magnetic material such as aluminum isolate the shaft 60 from the magnetic material of sections 66 and 68. Magnet 72 is a permanent magnet having poles on its opposite faces 74 and 76. Some of the flux from the magnet passes through core section 66 to the rim 78 of that section, and then across the gap between rims 78 and 80 and through core section 68 to the opposite pole of the magnet. Thus, the wheel rim has two opposite poles at 78 and 80 to which a nut 26 is attracted as shown at the bottom of FIGURE 6. The magnetic attraction is sufficient to firmly retain nut 26 on the rim of the wheel, and this nut then can act as a driver for other nuts in the chute which are not retained on the wheel.

The number of nuts which are held by magnetic attraction on the rim of the wheel determines the amount of driving force which is available to impel nuts through the chute 17. Referring to FIGURE 7, it may be seen that the rim of the wheel 18 projects into a channel 86 which forms an extension of the chute between chute sections 16 and 17. The poles 78 and 80 at the rim of wheel 18 contact several nuts 26 in the channel and hold these nuts on the wheel by magnetic attraction. Nuts are shown entering channel 86 from chute section 16 at a feed point 88 and leaving the channel 86 at a discharge point 90 from which they enter chute section 17. The channel has flanges 92 like the flanges 27 (FIGURE 3) on the chute section 16. While the nuts 26 traverse the channel 86 from feed point 88 to discharge point 90, they travel in the space between flanges 92 and the base 94 of the channel. When a nut reaches the discharge point 90, it is stripped from wheel 18 by the flanges 92, and it is pushed into the chute section 17 by the nuts 26 behind it which are still held magnetically on the wheel 18. The channel 86 and chute sections 16 and 17 are supported on base 64 by a stand 95.

The number of nuts retained on the wheel at any one time may be varied by adjusting the position of a finger 100 which is shown in a raised position in FIGURE 7. The finger extends through an aperture in a block 101 affixed to a wall of the stand 95. A set screw 103 may be loosened to allow longitudinal adjustment of the finger 100 and then may be tightened against the finger to hold it in place. The tip of finger 100 may be advanced into the space between flanges 92 of the channel 94 so as to hold some of the nuts 26 in the channel away from the rim of the wheel 18. Thus, the number of nuts actually retained on the wheel depends on how far finger 100 is advanced into the channel from the position shown in FIGURE 7. The finger is flexible enough to conform to the curvature of the channel and yet has enough resilience to hold nuts away from the rim of wheel 18.

FIGURE 8 illustrates another way of adjusting the number of nuts held on the wheel 18. In this embodiment, the channel 86 and its stand 95 are pivoted about a pivot point 106 so that only a narrow portion of the rim of wheel 18 adjacent the discharge point 90 extends into the channel beyond the flanges 92. The rest of the wheel rim does not contact nuts in the channel and so does not hold nuts on the wheel. The position of the channel 86 and its stand 95 may be adjusted by operation of an adjusting device 107. An adjusting screw 109 extends through a block 111, which is affixed to base 105, and is screwed through a movable block 113. When the screw 109 is turned, the movable block 113 moves axially of the screw. This axial movement is translated to pivotal movement of channel 86 and stand 95 by means of a linkage comprised of arms 115 and 117. Arm 115 is affixed to movable block 113, and arm 117 is jointed at one end to arm 115 and at its other end to the stand 95. If arm 115 is moved upward as viewed in FIGURE 8 by rotation of screw 109, link arm 117 draws stand 95 upward and to the right back toward a level position.

As shown in FIGURE 9, a similar adjustment may be made by simply shifting either the channel 86 or the wheel 18 horizontally relative to one another. In this view the entire channel 86 and its stand 95 have been shifted to the right toward one side of the wheel such that only a part of the wheel at its left side extends into the channel and contacts nuts therein, thus holding only those nuts contacted on the rim of the wheel.

The adjusting device 114 for moving the stand and channel comprises a block 116 affixed to base 64, another block 118 affixed to stand 95, and an adjusting screw 120 which extends through block 116 and is screwed through block 118. The screw is connected to block 116 so as to remain axially stationary when it is rotated. Such rotation of screw 120 moves block 118, stand 95 and channel 86 axially of the screw to provide a horizontal adjustment of the channel relative to wheel 18.

The invention provides apparatus for feeding nuts or like objects to an installation area wherein a magnetic wheel driver is employed to push the nuts through a chute to the installation area. The magnetic wheel slips if a condition occurs where the resistance to flow of nuts exceeds the force available to impel the nuts through the chute. The latter impelling force may be adjusted in any of the several ways which have been described herein to control the number of nuts attracted to the wheel, thereby varying the force available to push nuts through the chute.

I claim:

1. Apparatus for feeding nuts or the like to a work area including in combination a magnetic wheel having opposite magnetic poles each extending around the rim thereof, power means for rotating said wheel, means for supplying nuts in a serial sequence, a chute leading from said supply means to said work area via said magnetic wheel for guiding nuts in serial sequence to said work area, said wheel having said rim thereof closely adjacent said chute to contact nuts carried by said chute and retain said nuts on said rim by magnetic attraction, said chute leading from said supply means to a feed point at the rim of said wheel and extending along said rim a predetermined distance from said feed point to a discharge point where nuts may be supplied from said wheel toward said work area, the arcuate distance between said feed point and said discharge point measured along said rim determining the number of nuts of a given size which can be retained side-by-side on said wheel and thereby determining the force available to push nuts along said chute from said wheel toward said work area, and means for varying the arcuate distance between said feed point and said discharge point to thereby vary said force by varying the number of nuts retained on said wheel, said varying means including means adjustable to hold a variable number of nuts away from said rim to thereby vary the location of one of said points.

2. The apparatus of claim 1 wherein said chute includes a portion at said discharge point for stripping nuts from said wheel to allow said nuts to travel in side-by-side relation through said chute toward said work area.

3. The apparatus of claim 2 wherein said varying means includes means mounting said chute and said wheel for relative movement to allow adjustment of the distance between said discharge point and said feed point and thereby vary said force, and said varying means including means for retaining said chute and said wheel in given positions.

4. Apparatus for feeding nuts or the like to a work area including in combination a wheel having oppositely magnetized poles each extending around the rim thereof, power means operatively connected to said wheel for rotating the same, supply means for feeding magnetizable nuts, a chute leading from said supply means to said work area via said wheel for guiding nuts serially to said work area, said chute extending along the rim of said wheel a predetermined distance between a feed point and a discharge point, said wheel having said rim thereof closely adjacent said chute to contact nuts carried by said chute and retain a predetermined number of nuts side by side on said rim, thereby providing a predetermined driving force effective to push nuts from said wheel along the portion of said chute leading to said work area, stripping means associated with said chute for separating nuts from said wheel at said discharge point, and means for varying the arcuate distance between said feed point and said discharge point to thereby vary said force, said varying means including means adjustable to hold a variable number of nuts away from said wheel rim to thereby vary the location of one of said points.

5. The apparatus of claim 4 wherein said stripping means is a portion of said chute.

6. In apparatus for feeding nuts or the like to a work area wherein nuts are fed through a chute leading from a source of nuts to a work area, the combination therewith of a magnetic wheel having opposite magnetic poles at and extending around the rim thereof, said wheel having said rim thereof extending into said chute to contact nuts therein and to temporarily retain those nuts on the rim of said wheel by magnetic attraction such that the retained nuts can push other nuts downstream from said wheel in said chute, said wheel comprising two half-wheels clamped together face-to-face and a face polarized magnet between said half wheels oriented to polarize the rims of said half wheels in an opposite sense, said wheel being mounted for rotation to drive nuts through said chute by pushing the same with the nuts retained on said wheel, and means adjustable to hold a variable number of nuts away from said wheel rim to thereby vary the number of nuts retained on said rim and thus vary the force available to push other nuts through said chute.

7. A method of feeding nuts or the like to a work area comprising selecting nuts from a source thereof, feeding the selected nuts through a chute to a feed point on the rim of a magnetic wheel and along the wheel rim to a discharge point on said rim, said wheel contacting nuts between said points and retaining the contacted nuts on said rim by magnetic attraction, rotating said wheel to push nuts downstream from said wheel with the nuts retained on said rim, stripping nuts from said wheel at said discharge point, and holding nuts away from said wheel rim between the original feed point and discharge point to thereby set the effective length of said wheel rim in contact with nuts and therefore set the force available to push nuts downstream from the nuts retained on said wheel.

8. The method of claim 7 wherein said holding step is accomplished by inserting a spacer element between said wheel rim and nuts in said chute over a portion of the distance between the original feed and discharge points.

9. The method of claim 7 wherein said holding step is accomplished by relatively moving the chute and the wheel to change the amount of said wheel rim that projects into said chute and thereby change the number of nuts contacted by said wheel rim.

10. The method of claim 9 wherein a portion of said chute is moved pivotally relative to said wheel to hold nuts away from said wheel.

11. The method of claim 9 wherein a portion of said chute and said wheel are moved rectilinearly relative to each other to hold nuts away from said wheel.

12. Apparatus for feeding nuts or the like to a work area including in combination a magnetic wheel having opposite magnetic poles each extending around the rim of said wheel, power means for rotating said wheel, means for supplying nuts in a serial sequence, a chute leading from said supply means to said work area via said magnetic wheel for guiding nuts in serial sequence to said work area, said wheel having said rim thereof closely adjacent said chute to contact nuts carried by said chute and retain said nuts on said rim by magnetic attraction, said chute leading to a feed point at the rim of said wheel and extending along said rim a predetermined distance from said feed point to a discharge point where nuts may be supplied from said wheel toward said work area, the arcuate distance between said feed point and said discharge point measured along said rim determining the force available to push nuts along said chute from said wheel toward said work area, and means for varying the arcuate distance between said feed point and said discharge point to thereby vary said force, said chute including a channel having flanges extending along said wheel from said feed point to said charge point with a portion of said flanges serving to strip nuts from said wheel at said discharge point, and said varying means comprising means mounting said channel for movement relative to said wheel to allow adjustment of the distance between said discharge point and said feed point.

13. The apparatus of claim 12 in which said channel is mounted for pivotal movement.

14. The apparatus of claim 12 in which said channel is mounted for rectilinear movement.

15. Apparatus for feeding nuts or the like to a work area including in combination a magnetic wheel having opposite magnetic poles each extending around the rim thereof, power means for rotating said wheel, means for supplying nuts in a serial sequence, a chute leading from said supply means to said work area via said magnetic wheel for guiding nuts in serial sequence to said work area, said wheel having said rim thereof closely adjacent said chute to contact nuts carried by said chute and retain said nuts on said rim by magnetic attraction, said chute leading to a feed point at the rim of said wheel and extending along said rim a predetermined distance from said feed point to a discharge point where nuts may be supplied from said wheel toward said work area, the arcuate distance between said feed point and said discharge point measured along said rim determining the force available to push nuts along said chute from said wheel toward said work area, and means for varying the arcuate distance between said feed point and said discharge point to thereby vary said force, said varying means comprising a movable member having a portion adjacent to one of said points to hold nuts away from said wheel at a space not between said feed and discharge points, said member being movable along said rim of said wheel to adjust the distance between said feed point and said discharge point, and means for adjustably positioning said movable member along the rim of said wheel.

16. The apparatus of claim 15 in which said movable member has said portion thereof at said feed point.

References Cited

UNITED STATES PATENTS

| | | | |
|---|---|---|---|
| 1,185,329 | 5/1916 | Janisch | 198—212 |
| 2,427,659 | 9/1947 | Collyer | 198—160 |
| 3,164,269 | 1/1965 | Roosevelt | 198—41 |
| 3,215,289 | 11/1965 | Gleason | 198—41 |

EVON C. BLUNK, *Primary Examiner.*

RICHARD E. AEGERTER, *Examiner.*